(12) United States Patent
Otsuki

(10) Patent No.: US 7,907,485 B2
(45) Date of Patent: Mar. 15, 2011

(54) RECORDING DEVICE

(75) Inventor: Jun Otsuki, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 215 days.

(21) Appl. No.: 11/814,879

(22) PCT Filed: Jan. 17, 2007

(86) PCT No.: PCT/JP2007/051015
§ 371 (c)(1),
(2), (4) Date: Jul. 26, 2007

(87) PCT Pub. No.: WO2007/083815
PCT Pub. Date: Jul. 26, 2007

(65) Prior Publication Data
US 2008/0310266 A1 Dec. 18, 2008

(30) Foreign Application Priority Data

Jan. 20, 2006 (JP) ................... 2006-013089

(51) Int. Cl.
*G11B 7/00* (2006.01)
(52) U.S. Cl. .................................... 369/47.33
(58) Field of Classification Search ............... None
See application file for complete search history.

(56) References Cited

U.S. PATENT DOCUMENTS

| 5,430,703 | A | | 7/1995 | Tsuji et al. |
| 5,485,447 | A | * | 1/1996 | Minoda ............... 369/47.12 |
| 6,259,859 | B1 | | 7/2001 | Katsuki et al. |
| 6,424,614 | B1 | | 7/2002 | Kawamura et al. |
| 6,438,083 | B1 | * | 8/2002 | Kroon ................... 369/47.3 |
| 2008/0205217 | A1 | * | 8/2008 | Konieczny ............ 369/47.33 |
| 2008/0205234 | A1 | * | 8/2008 | Konieczny ............... 369/94 |

FOREIGN PATENT DOCUMENTS

| JP | 05-342764 A | 12/1993 |
| JP | 08-212561 A | 8/1996 |
| JP | 11-196372 A | 7/1999 |
| JP | 2000-195174 A | 7/2000 |
| JP | 2002-056604 A | 2/2002 |
| JP | 2004-171667 A | 6/2004 |
| JP | 2005-011416 A | 1/2005 |

OTHER PUBLICATIONS

The above foreign patent documents were cited in the International Search Report issued on Apr. 3, 2007, in PCT/JP2007/051015. Previously submitted on Jul. 26, 2007.

The foreign patent documents 3, 5, and 7 were cited in the International Preliminary Report on patentability issued on Jul. 22, 2008 in PCT/JP2007/051015. Previously submitted on Aug. 15, 2008.

* cited by examiner

*Primary Examiner* — Christopher R Lamb
(74) *Attorney, Agent, or Firm* — Cowan, Liebowitz & Latman, P.C.

(57) ABSTRACT

A recording device is equipped with an input unit for inputting information data, a memory for storing the input information data, a writing unit for reading the information data stored in the memory, and writing the information data read from the memory on a disk-like recording medium having plural recording layers, and a control unit for changing a writing procedure by the writing unit, in accordance with a difference between a writing position on the disk-like recording medium by the writing unit and a position on the disk-like recording medium where the recording layer is to be transitioned, coming to a predetermined value.

4 Claims, 10 Drawing Sheets

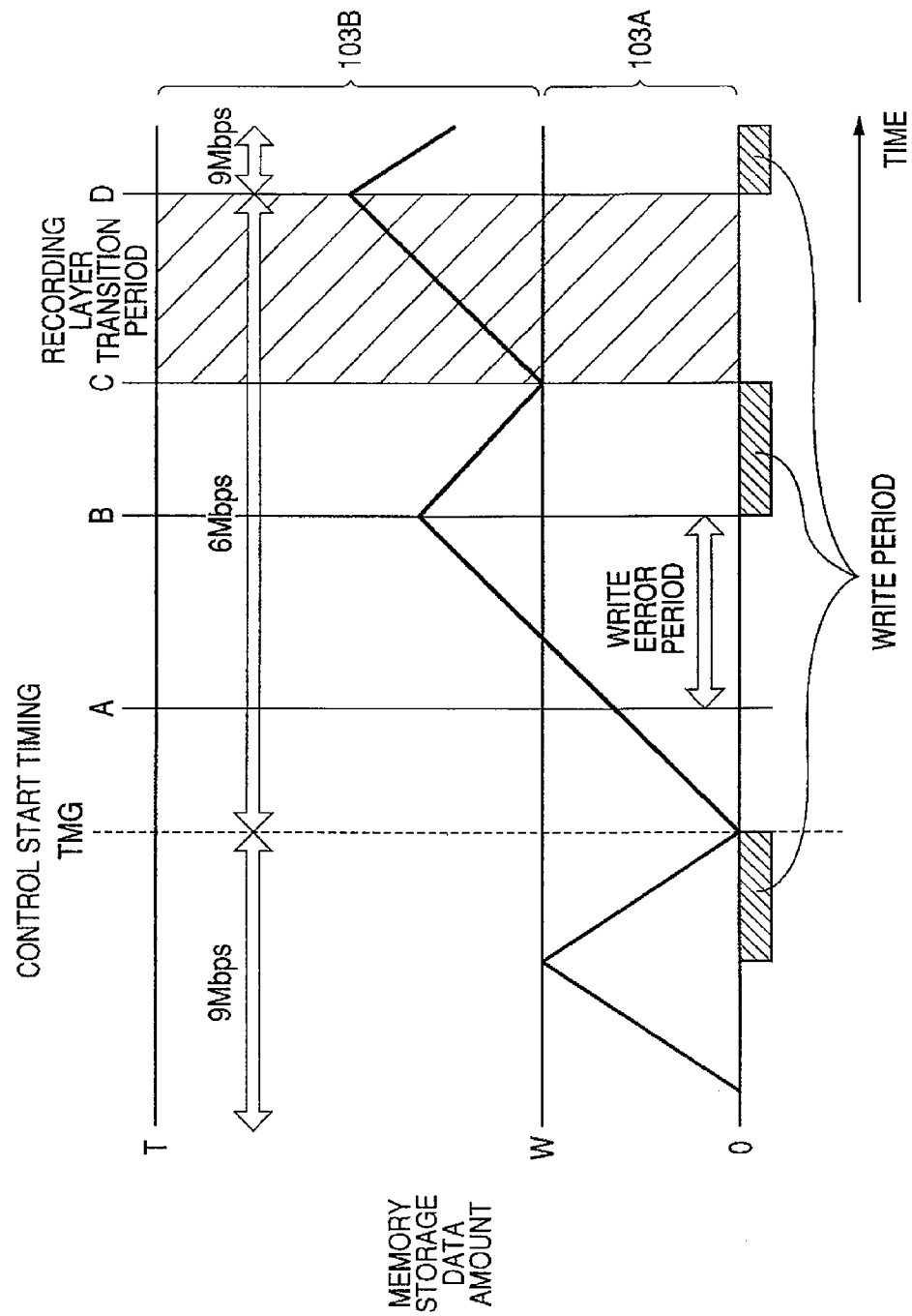

RECORDING DEVICE

TECHNICAL FIELD

The present invention relates to a device which records information data such as image data or the like on a disk-like recording medium.

BACKGROUND ART

Conventionally, a recording device which records information data such as image data or the like on an optical disk such as a DVD (digital versatile disk) or the like is known. Further, a multi-layer type optical disk in which the recording capacity thereof is increased by providing plural record/playback (or recording/reproducing) layers per one optical disk has been proposed (see Japanese Patent Application Laid-Open No. H08-212561 corresponding to U.S. Pat. No. 6,424,614).

Here, with respect to the optical disk having the plural recording/reproducing layers as just described, it is assumed that, in case of recording continuous information data over the plural recording/reproducing layers, the recording layer on which the information data is recorded is transitioned from a first recording layer to a second recording layer.

Even in this case, a method of temporarily storing in a memory the information data input during a recording layer transition period and then recording the stored information data to the second recording layer of the optical disk after the end of the recording layer transition period is proposed.

However, it is assumed that, in the state that, after the end of the recording layer transition period, the information data input during the recording layer transition period is being stored immediately after restart of the recording, a write error occurs by displacement of an optical pickup due to a contingent accident or the like.

In such a case, it is necessary to also temporarily store also the information data input during a time period from the recording stop caused by the error to restart of the recording after recovery from the error. For this reason, there is a probability that, depending on a memory capacity, an amount of the information data to be stored in the memory exceeds the relevant memory capacity, whereby there is a fear that the recording data is missing.

On the contrary, it may happen that the write error occurs due to displacement of the optical pickup and then transition of the recording layer occurs in the optical disk immediately after the restart of the recording.

Also, in this case, there is a probability that, depending on a memory capacity, an amount of the data to be stored in the memory exceeds the relevant memory capacity, whereby there is a fear that the recording data is missing.

DISCLOSURE OF THE INVENTION

An object of the present invention is to solve such problems as described above.

Another object of the present invention is to, in a case where information data is recorded on a recording medium having plural recording layers, prevent missing of recording data during a recording layer transition period without preparing a large-capacity memory and thus enable continuous recording with improved safety of the information data.

In order to achieve the above objects, according to an aspect of the present invention, there is provided a recording device which includes:

an input unit adapted to input information data;
a memory adapted to store the input information data;
a writing unit adapted to read the information data stored in the memory, and write the information data read from the memory on a disk-like recording medium having plural recording layers; and
a control unit adapted to change a writing procedure by the writing unit, in accordance with a difference between a writing position on the disk-like recording medium by the writing unit and a position on the disk-like recording medium where the recording layer is to be transitioned, coming to a predetermined value.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 is a diagram illustrating a change of the amount of data to be stored in the memory in a case where bit rate control according to the exemplary embodiment of the present invention is executed.

BEST MODE FOR CARRYING OUT THE INVENTION

Hereinafter, exemplary embodiments of the present invention will be described.

First Exemplary Embodiment

Figure 1:
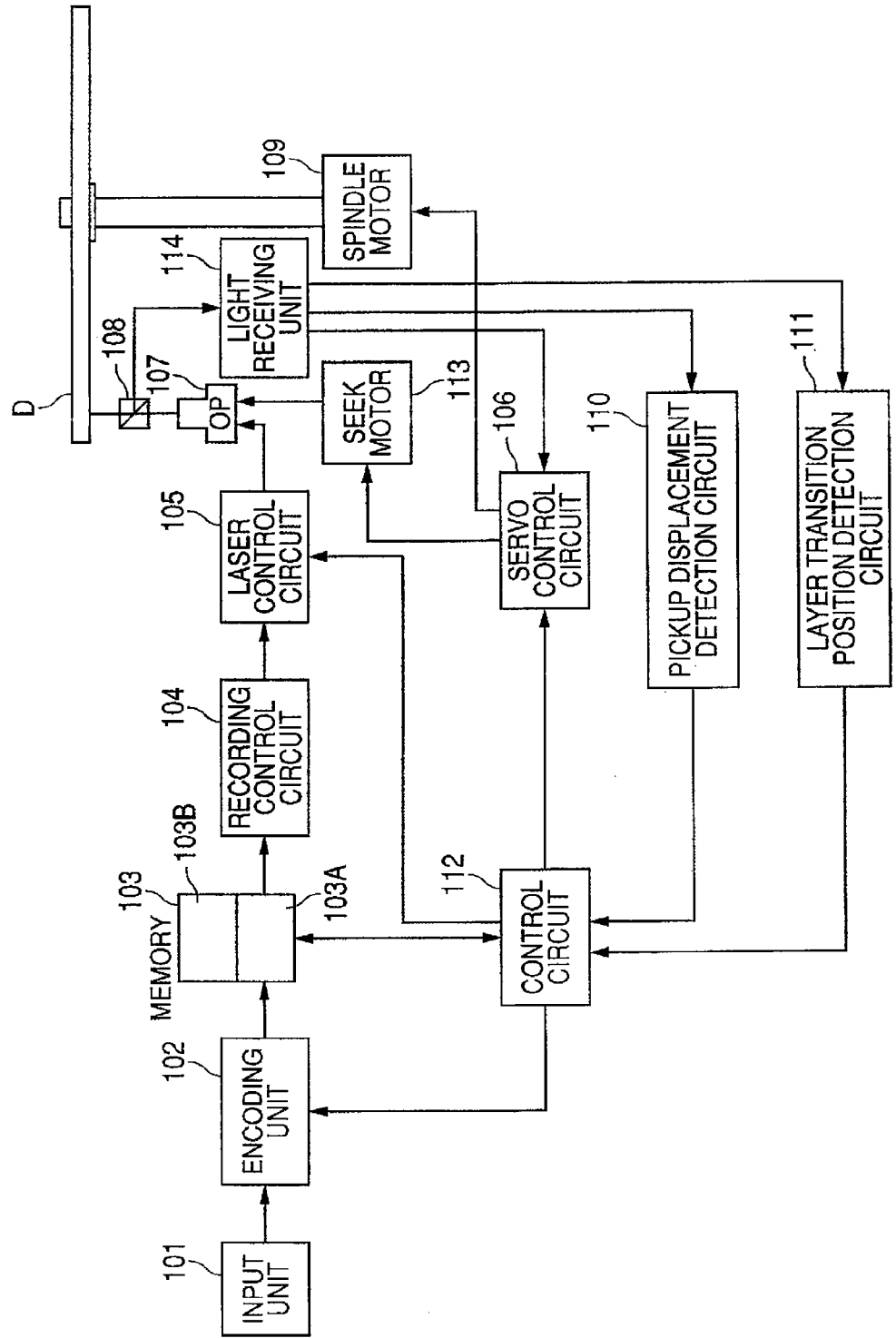
FIG. 1 is a block diagram illustrating a recording device according to the exemplary embodiments of the present invention.

FIG. 1 illustrates one exemplary embodiment of the block constitution of an optical disk recording device according to the present invention.

First, image data input from an input unit 101 is encoded by an encoding unit 102, and the encoded image data is temporarily stored in a memory 103. More specifically, in the encoding unit 102, the image data input from the input unit 101 is encoded by, for example, an MPEG (Motion Picture Experts Group) system. Then, the encoded image data temporarily stored in the memory 103 is supplied to a recording control circuit 104. In the recording control circuit 104, the encoded image data supplied from the memory 103 is modulated, and the modulated image data is then transferred to a laser control circuit 105. Here, the laser control circuit 105 controls an optical pickup 107 to irradiate laser beams onto an optical disk D, thereby recording the data on the disk D. In the present embodiment, the optical disk D will be described by taking an optical disk having two recording layers for instance. However, it is of course possible to use an optical disk having three or more recording layers.

In response to an instruction issued from a control circuit 112, a servo control circuit 106 controls a spindle motor 109 to rotate the optical disk D at predetermined rotation speed. Further, the servo control circuit 106 controls a seek motor 113 based on a tracking error signal and a track address signal acquired from a light receiving unit 114, thereby controlling the position of the optical pickup 107.

A spectroscopic prism 108 disperses reflected light of the laser beams irradiated onto the optical disk D, and transfers the dispersed light to the light receiving unit 114. Then, the light receiving unit 114 receives the reflected light from the optical disk D, generates information such as tracking error signal, a track address and the like by a known method, and transfers the generated information to the servo control circuit 106, a pickup displacement detection circuit 110 and a layer transition position detection circuit 111.

The pickup displacement detection circuit 110 detects displacement of the optical pickup 107 from a predetermined position on the basis of the tracking error signal or the like sent from the light receiving unit 114. Then, the pickup displacement detection circuit 110 transfers a write error detection signal indicating the detected displacement of the optical pickup 107 to the control circuit 112.

Moreover, the layer transition position detection circuit 111 detects the present recording position of the optical pickup 107 on the basis of the track address information sent from the light receiving unit 114, and further detects the distance between the present recording position of the optical pickup 107 and a predetermined transition start position of the recording layer. Then, if the detected distance is equal to or shorter than a predetermined value, the layer transition position detection circuit 111 transfers a control signal indicating such a detected result to the control circuit 112. Thus, in response to the sent control signal, the control circuit 112 executes the following control with respect to the memory 103.

Figure 2:
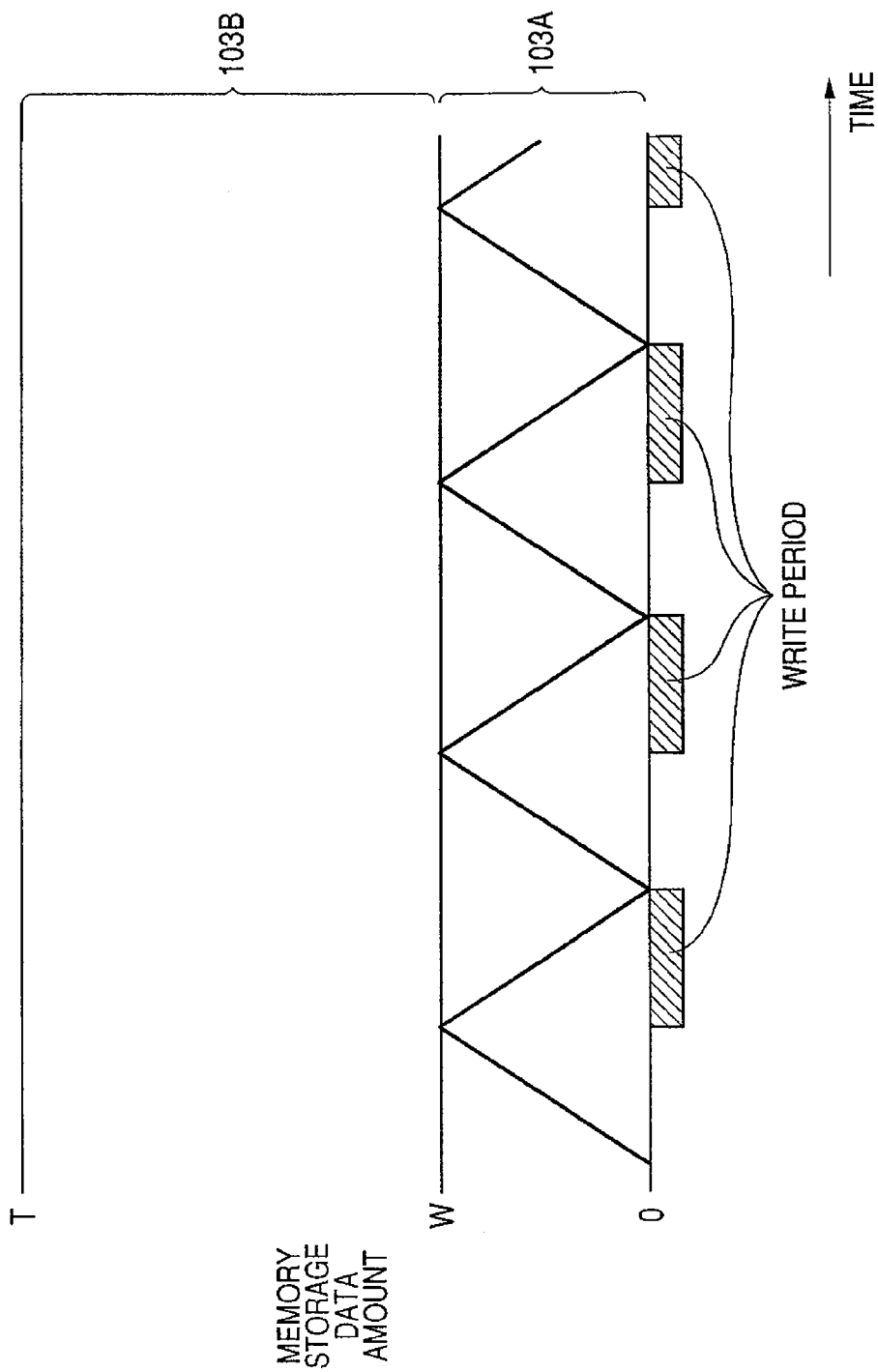
FIG. 2 is a diagram illustrating a change of an amount of data to be stored in a memory of the recording device of FIG. 1.

FIG. 2 illustrates a change of an amount of data to be stored in the memory 103 when ordinary recording is normally executed to the same recording layer of the optical disk D. Here, the memory 103 has plural addresses specified by the addresses 0 to T as the whole capacity. In the ordinary recording, the area defined from the address 0 to the address W of the memory 103, i.e., a memory area 103A, is used. On the other hand, the area defined from the address W to the address T, i.e., a memory area 103B, is normally used as a shock proof memory area.

In the present embodiment, the input image data is encoded by the encoding unit 102, and the encoded image data is stored in the memory area 103A of the memory 103 according to certain clocks. Then, the encoded image data read from the memory area 103A is written onto the optical disk D. Here, since a recordable rate of the optical disk D is higher than a data rate of the encoded image data, the encoded image data is once stored in the memory 103. Subsequently, at the time when the encoded image data of a predetermined amount is stored in the memory 103, the encoded image data is read from the memory area 103A, and the read image data is then written onto the optical disk D. As a result, the encoded image data is intermittently written onto the optical disk D. It should be noted that FIG. 2 illustrates an example of two times speed writing.

During a time period in which no data writing is effected to the optical disk D, the encoded image data is unilaterally stored in the memory area 103A. On the other hand, during a period that the data are written onto the optical disk D, the encoded image data read from the memory area 103A are written onto the optical disk D while the encoded image data are stored in the memory area 103A.

By executing such intermittent recording as described above, it is possible to suppress power consumption as compared with the case of executing continuous recording on the optical disk D. Incidentally, it is possible to more suppress the power consumption by making longer a time period in which no writing is executed in the intermittent recording. On the other hand, in this case, it is necessary to provide the large-capacity memory area 103A, i.e., large-capacity memory 103.

Since the writing speed to the optical disk D is twice the data rate of the encoded image data, the write period and the no write period in the intermittent recording satisfy the one-to-one relation as illustrated in FIG. 2. Furthermore, if the encoded image data are stored fully up to the portion defined by the address W in the memory 103, i.e., the memory area 103A illustrated in FIG. 1, during the no write period, then the control circuit 112 controls the laser control circuit 105 to start writing the data onto the optical disk D.

That is, in the present embodiment, the data amount from the address 0 to the address W in the memory 103 is set as the predetermined data amount, and the data writing onto the optical disk D is started at the time when the encoded image data of this data amount is stored in the memory 103.

Moreover, while the encoded image data is being recorded (or written) on the first recording layer of the optical disk D, if the recording reaches the position where the recording layer is to be transitioned, the layer transition position detection circuit 111 transfers to the control circuit 112 the signal indicating that the recording reached the transition start position.

Then, the recording layer transition processing to the optical pickup 108 is executed by the control circuit 112, and at the same time the plural encoded image data input and encoded during this processing are stored sequentially in the memory 103. Then, if the recording layer transition processing is completed, the encoded image data stored in the memory 103 is again read, and writing (or recording) of the read data onto the second recording layer of the optical disk D is started.

Incidentally, if the encoded image data are stored fully up to the portion defined by the address W of the memory area 103A during the recording layer transition processing, storage of the encoded image data to the memory area 103B is started. However, the detailed operation of this processing will be described later.

Figure 3:
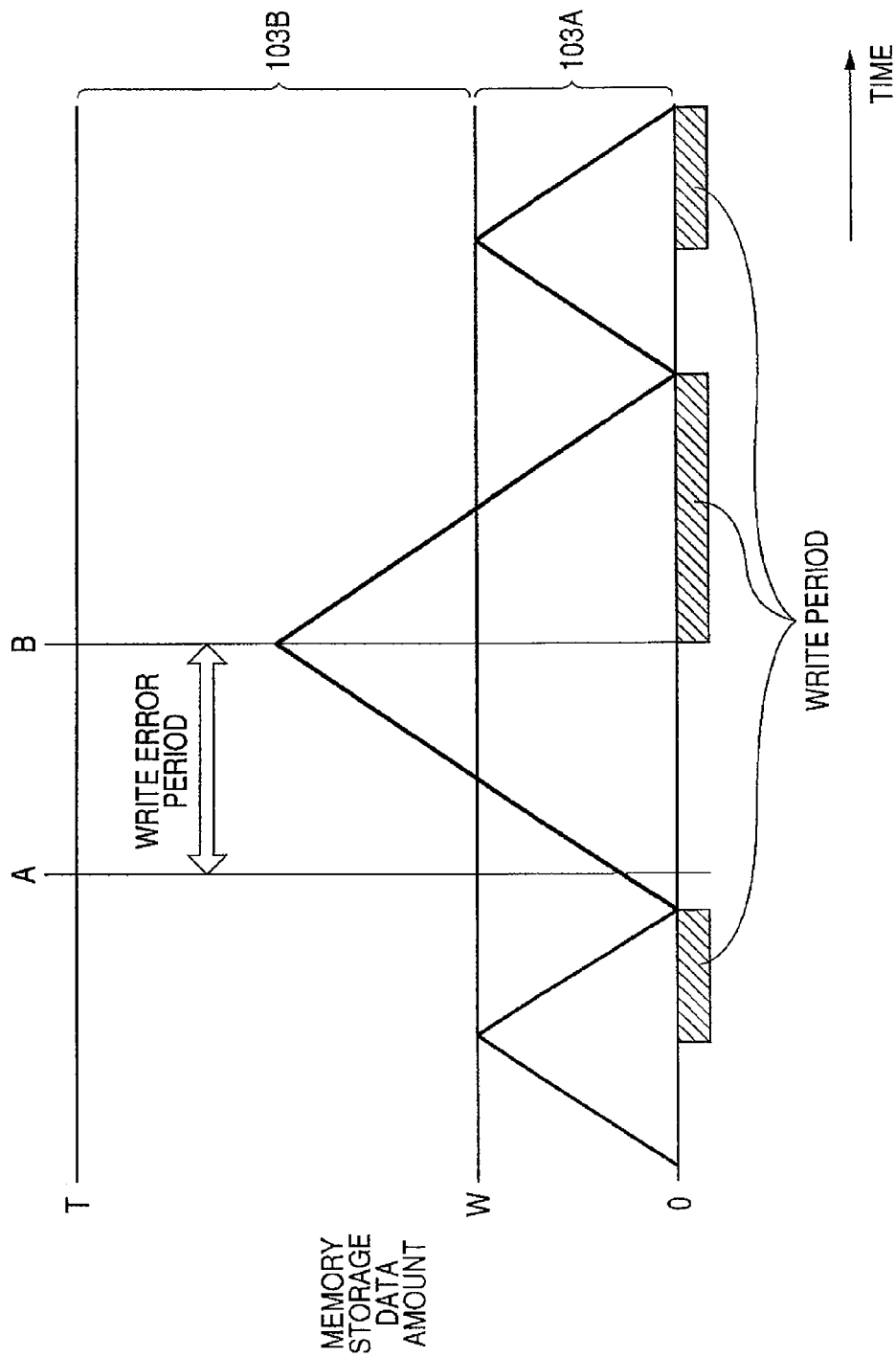
FIG. 3 is a diagram illustrating a change of the amount of data to be stored in the memory of the recording device of FIG. 1 in a case where a write error occurs.

FIG. 3 is a diagram illustrating a change of the amount of data to be stored in the memory 103 in a case where a write error occurs in normal recording.

The pickup displacement detection circuit 110 detects a write error occurred due to displacement of the optical pickup 107 caused by a contingent accident such as an external shock or the like, and then supplies a control signal indicating such a detected result to the control circuit 112. Thus, in response to the supplied control signal, the control circuit 112 controls the laser control circuit 105 to stop writing (or recording) the image data onto the optical disk D. Then, the input encoded image data are stored in the memory 103 until the recording is restarted. In this regard, if the encoded image data are stored fully up to the portion defined by the address W in the memory 103, then the encoded image data are stored successively in the memory area 103B of the memory 103.

As just described, the memory area 103B is used as a so-called shockproof memory area for preventing signal missing caused by a write error due to a shock or the like. In the present embodiment, to make a condition of memory control clearly understandable, the whole capacity of the individual memory 103 is divided into the memory area 103A and the memory area 103B. However, it is also possible to use the whole capacity of the memory 103 as the memory area 103A and provide another separate memory as the memory area 103B.

Then, if the optical pickup 107 is returned to the original recording position by the seek motor 113 and thus it goes into a data writable state of the optical disk D, the data recording onto the optical disk D is restarted.

Here, if it is assumed that a write error occurs at the A point illustrated in FIG. 3, all the encoded image data input until the recording is restarted at the B point are stored in the memory 103. More specifically, the encoded image data are stored preferentially in the memory area 103A of the memory 103. Subsequently, if the encoded image data are stored up to the portion defined by the address W in the memory 103, then the encoded image data are stored successively in the memory area 103B of the memory 103. After that, if the recording is restarted at the B point, the encoded image data are read sequentially from the address 0, and the read image data are recorded on the optical disk D. If all the encoded image data stored in the memory 103 are written onto the optical disk D, the data writing onto the optical disk D is stopped. Therefore, in this case, the data writing period beginning from the recording restart at the B point is longer than the data writing period in the normal operation, as illustrated in FIG. 3.

Figure 5:
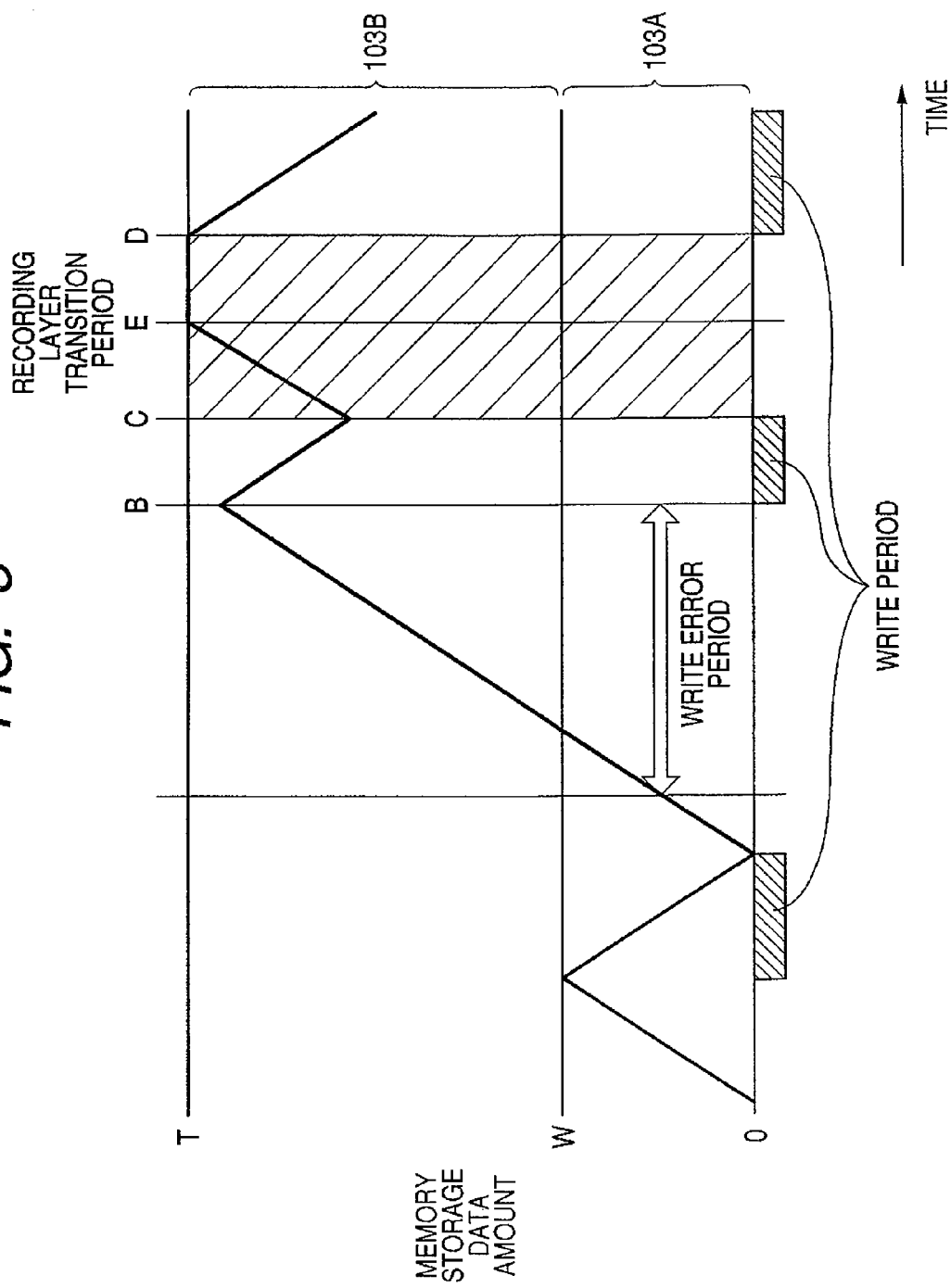
FIG. 5 is a diagram illustrating a change of the amount of data to be stored in the memory in a case where the write error and recording layer transition successively occur.

FIG. 5 is a diagram illustrating an example of a change of the amount of encoded image data to be stored in the memory in a case where the transition of the recording layer is executed immediately after the write error state to the optical disk D recovered to the data writable state as described above.

Here, it is assumed that occurrence of a write error at the A point is detected and data writing onto the optical disk D becomes possible at the B point.

Here, if the transition of the recording layer of the optical disk D is executed during the period between the C and D points immediately after the data writing onto the disk became possible, the data writing onto the disk cannot be executed during the recording layer transition period.

Therefore, in this case, the image data writing onto the disk is not executed after the C point, and the input encoded image data are stored in the memory 103. If it intends to further store the encoded image data in the memory area 103B from the C point in the state that the amount of image data already stored in the memory area 103B has increased, there is a probability that the capacity of encoded image data input after the E point exceeds the capacity of the memory area 103B. In other words, in the case where the image data are stored up to the address T in the memory 103, there is a probability that missing of the encoded mage data subsequently input occurs.

Consequently, the present embodiment adopts the following countermeasure.

Figure 6:
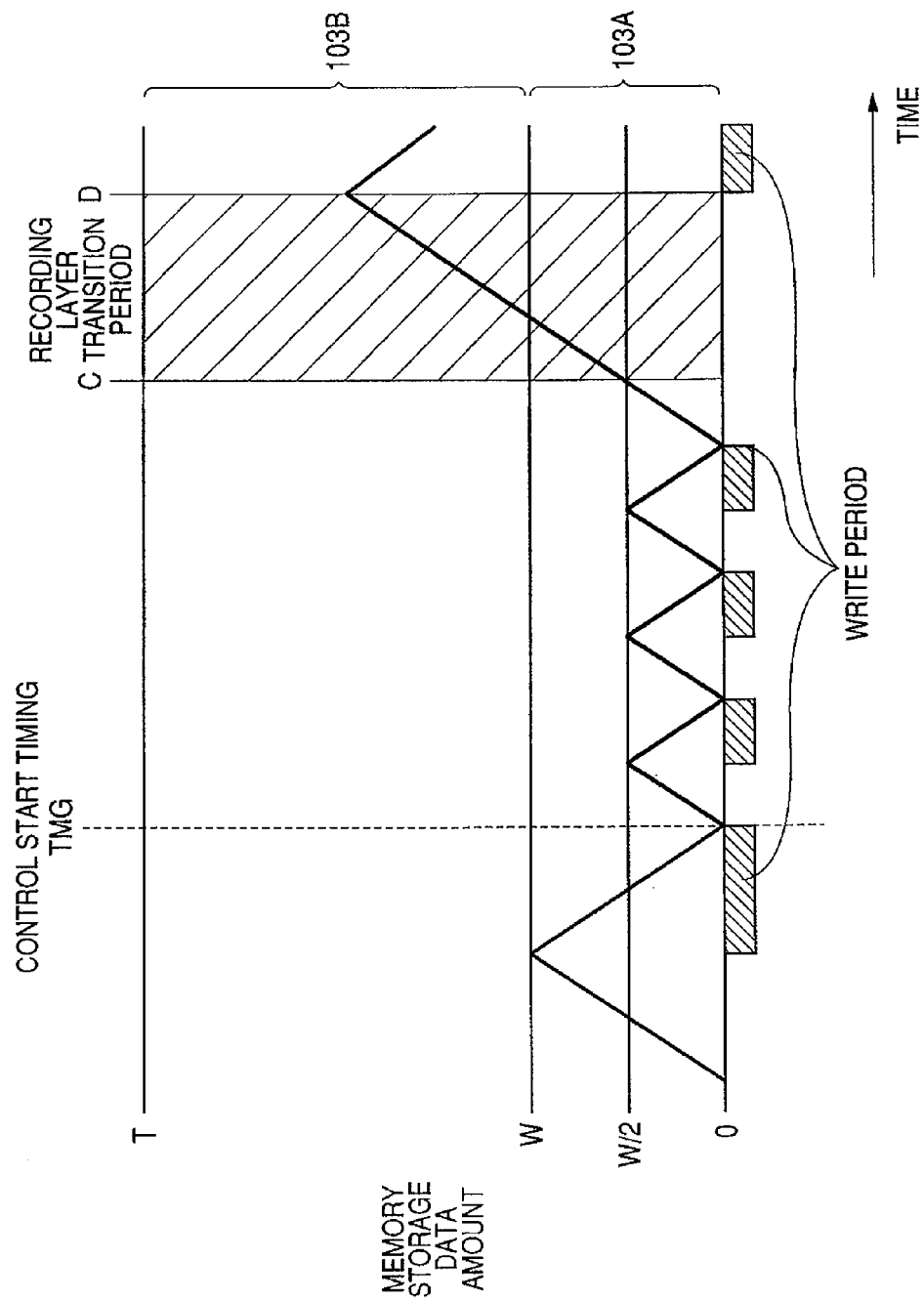
FIG. 6 is a diagram illustrating a change of the amount of data to be stored in the memory in a case where intermittent recording control according to the exemplary embodiment of the present invention is executed.

FIG. 6 is a diagram illustrating a change of the amount of data to be stored in the memory 103, according to the first exemplary embodiment of the present invention.

In the present embodiment, the layer transition position detection circuit 111 detects that the present recording position reaches the position (track number) preceding to, by a predetermined value, the position (sector) where the layer transition for the optical pickup 107 is to be executed. For example, a signal of the layer transition position detection circuit 111 is output at the TMG point illustrated in FIG. 6.

Thus, the control circuit 112 makes the data write period to the optical disk D shorter than the former period. Incidentally, also this case executes the intermittent recording in which the period for storing the encoded image data in the memory 103 and the period for recording the encoded image data read from the memory 103 on the optical disk D as storing the encoded image data in the memory 103 are repeated.

In the present embodiment, while the data recording is being executed, if the present recording position comes close to the recording position where the recording layer is to be changed over, the period in which the period for writing the image data on the optical disk D and the period for not recording the image data on the optical disk D are repeated is made shorter than the former period.

For example, if the recording position reaches near the position where the recording layer is to be changed over, a threshold of the data amount for starting data writing onto the optical disk D is made smaller than that before the TMG point.

More specifically, in FIG. 6, before the TMG point, the data writing onto the optical disk D is started at the time when the data are stored up to the address W in the memory 103.

On the other hand, after the TMG point where it is detected that the data writing reached near the recording layer transition position, it is controlled to write the image data onto the optical disk D at the time when the image data are stored up to the address W/2 in the memory 103.

Consequently, in addition to the memory area 103B which is used for shockproof, the area from the address W/2 to the address W in the memory 103 can be used for storage of the encoded image data corresponding to the recording layer transition and for countermeasure of the write error.

Therefore, a possibility that the image data is missing when the recording layer is changed over can be lowered as compared with the case illustrated in FIG. 5.

Consequently, it is possible to improve safety of the recorded data around the recording layer transition, without increasing the whole memory capacity (the capacity from the address 0 to the address T in the memory 103) and thus without cost increasing.

In the present embodiment, the storage operation of the encoded image data to the memory 103 and the write operation of the image data onto the optical disk D are changed over between the normal control mode illustrated in FIGS. 2 and 3 and the recording layer transition control mode illustrated in FIG. 6.

Figure 4:
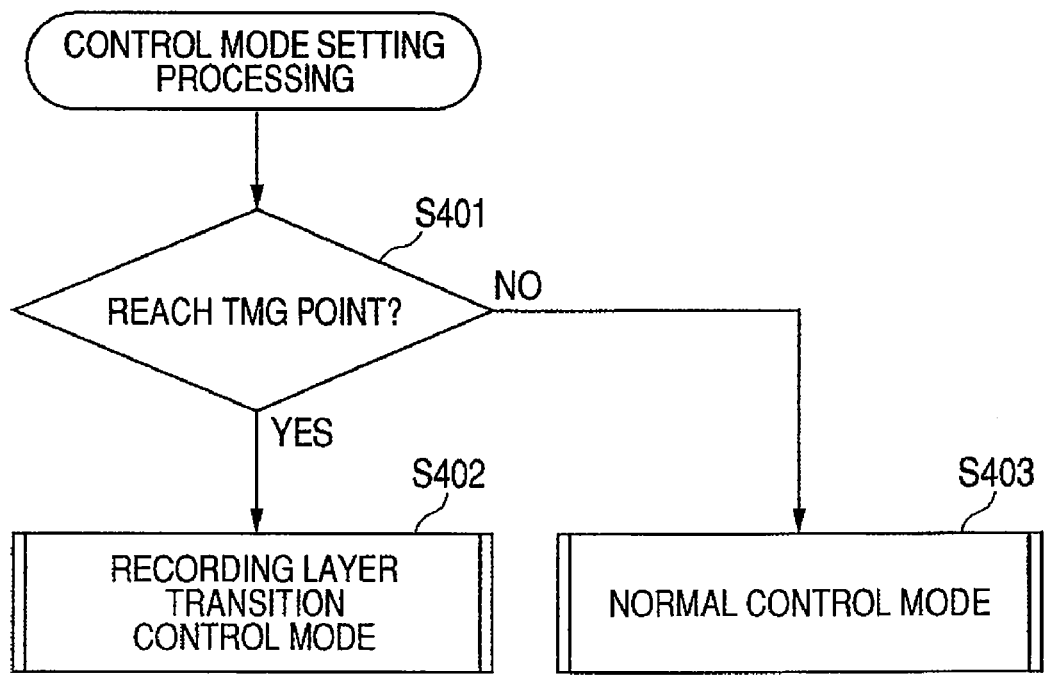
FIG. 4 is a flow chart for describing the operation to be executed in the case where the write error occurs in the recording device of FIG. 1.

FIG. 4 is a flow chart for describing the mode changeover operation to be executed between the normal control mode and the recording layer transition control mode.

In FIG. 4, it is first detected by the layer transition position detection circuit 111 whether or not the present recording position reaches the TMG point illustrated in FIG. 6 (step S401). If it is detected that the present recording position does not reach the TMG point, the operation is executed in the normal control mode (step S403). Meanwhile, if it is detected that the present recording position reaches the TMG point, the operation is executed in the recording layer transition control mode (step S402).

Incidentally, since the disk having the two layers is used in the present embodiment, the operation illustrated in the flow chart of FIG. 4 might be executed only in the case where the present recording layer is the first layer. Namely, the normal control mode might be set in the case where the present recording layer is the second layer.

Figure 7:
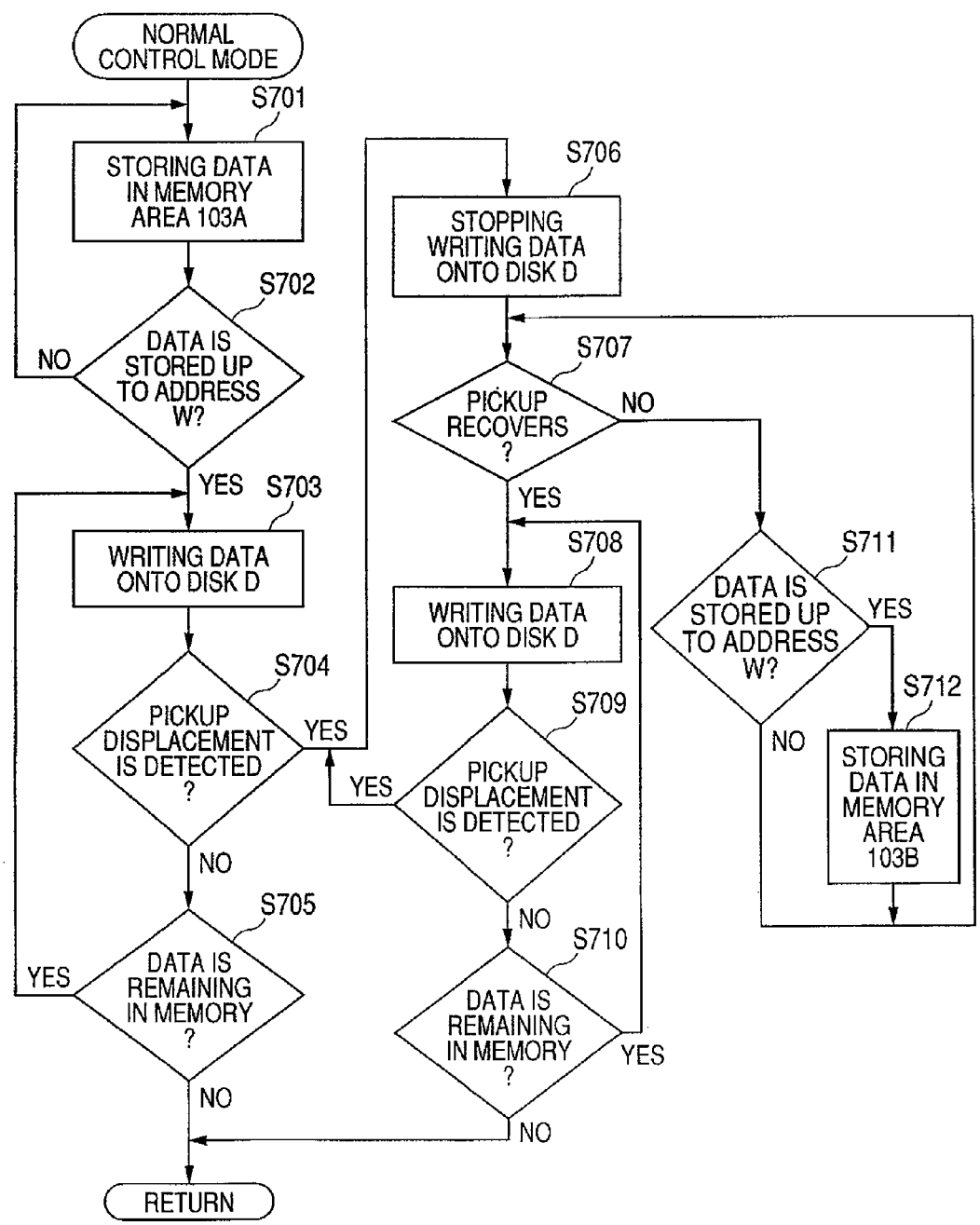
FIG. 7 is a flow chart for describing a write control operation according to the exemplary embodiment of the present invention.

FIG. 7 is a flow chart illustrating the processing to be executed by the control circuit 112 in the normal control mode.

In the normal control mode, the encoded image data are stored sequentially in the memory area 103A (that is, from the address 0 to the address W in the memory 103) (step S701). Then, if the encoded image data are stored up to the address W (step S702), the stored image data are read sequentially from the address 0 in the memory 103, and the read image data are written onto the optical disk D (step S703). At that time, it is further determined by the pickup displacement detection circuit 110 whether or not a write error due to displacement of the optical pickup 107 is detected (step S704). If it is determined that the write error is not detected, then the data writing onto the optical disk D continues until all the remaining image data in the memory 103 are read (step S705).

If all the image data stored in the memory 103 are written onto the optical disk D, the flow returns to the step S401 illustrated in FIG. 4.

On the other hand, if it is determined in the step S704 that the write error is detected, the data writing onto the optical disk D is stopped (step S706). Thus, the encoded image data input after that are stored successively in the memory area 103A, the optical pickup 107 is recovered to the original recording position by the pickup displacement detection circuit 110, and it is then determined whether or not the data writing onto the optical disk D becomes possible (step S707).

Here, if it is determined that the data writing onto the optical disk D becomes possible (at the B point illustrated in FIG. 3), the image data subsequent to the data at the time when the data writing was stopped in the step S706 are read sequentially from the memory 103, and the read image data are written onto the optical disk D (step S708). After then, if a write error caused by displacement of the optical pickup 107 is again detected, the flow returns to the step S706 (step S709). Meanwhile, if a write error is not detected, the data writing onto the optical disk D continues until all the remaining image data in the memory 103 are read (step S710).

If all the image data stored in the memory 103 are written onto the optical disk D, the flow returns to the step S401 illustrated in FIG. 4.

If it is determined in the step S707 that the optical pickup 107 is not recovered to the original recording position, it is further determined whether or not the encoded image data are stored up to the address W in the memory 103 (step S711). If it is determined that the encoded image data are not stored up to the address W in the memory 103, the image data are stored still continuously in the memory area 103A, and the flow returns to the step S707. Here, if the memory area 103A is full of the stored image data, the successively input encoded image data are stored in the memory area 103B (step S712). After then, the flow returns to the step S707 to again determine whether or not the write error period still continues.

As illustrated in FIG. 3, in the case where the optical pickup 107 is recovered and thus the data writing onto the optical disk D becomes possible before the memory area 103B is full of the image data, the input encoded image data are stored in the optical disk D without missing.

On the other hand, in the case where the write error period still continues even after the memory area 103B is full of the image data, the encoded image data sent from the encoding unit 102 after that is missing.

Figure 8:
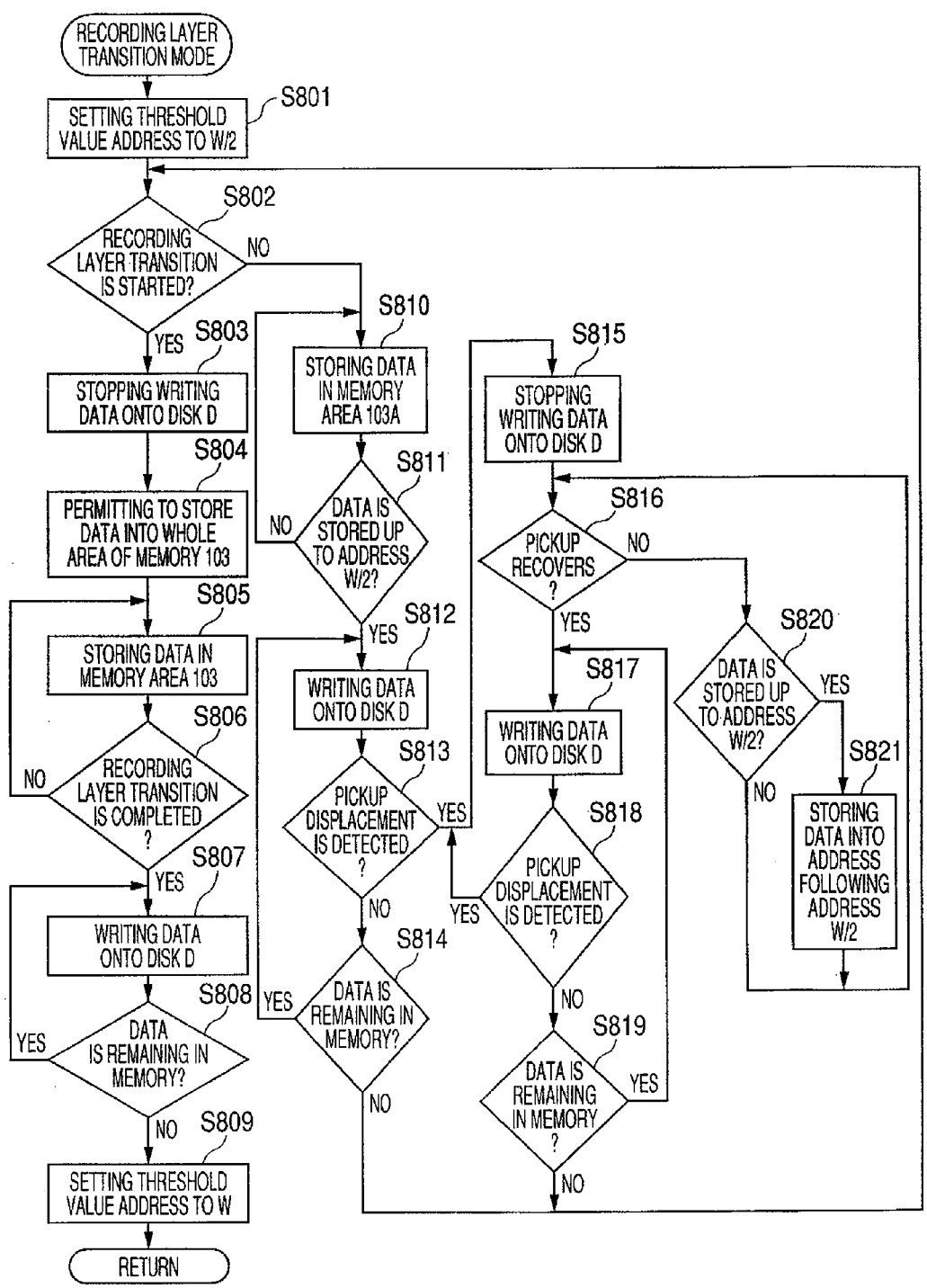
FIG. 8 is a flow chart for describing the operation according to the exemplary embodiment of the present invention.

FIG. 8 is a flow chart for describing the operation to be executed by the control circuit 112 in the recording layer transition control mode.

In FIG. 8, the address of the threshold (data amount) in the memory 103 for starting the data writing onto the optical disk D is set to W/2 (step S801).

That is, although the data writing onto the optical disk D is started if the image data are stored from the address 0 to the address W in the memory 103 in the normal control mode, the relevant address W is changed to the address W/2 in the recording layer transition control mode.

Next, it is detected by the layer transition position detection circuit 111 whether or not the present recording position reaches the position where the recording layer transition should be started (step S802).

If it is detected that the present recording position reaches the position where the recording layer transition should be started, that is, if it is detected that the present recording position reaches the recording layer transition start point C illustrated in FIG. 6, then the data writing onto the optical disk D is stopped (step S803). Subsequently, it is permitted to store the encoded image data in the whole area of the memory 103, that is, from the address 0 to the address T (step S804).

After then, the input encoded image data are stored sequentially in the memory 103 (step S805), and it is checked whether or not the recording layer transition is completed (recording layer transition end point D illustrated in FIG. 6) (step S806).

If the recording layer transition is not completed, the flow returns to the step S805. Meanwhile, if the recording layer transition is completed, the stored image data are read sequentially from the address 0 in the memory 103, and the read image data are written onto the optical disk D (step S807). Then, the data writing onto the optical disk D continues until all the remaining image data in the memory 103 are read (step S808). If the whole data stored in the memory 103 is written onto the optical disk D, the address of the threshold in the memory 103 for starting the data writing is set to W, and the flow returns to the step S401 illustrated in FIG. 4 (step S809).

On the other hand, if it is detected in the step S802 that the present recording position does not reach the position where the recording layer transition should be started, the encoded image data are stored sequentially from the headmost address in the memory 103 (step S810), and it is determined whether or not the encoded image data are stored up to the write address W/2 in the memory 103 (step S811). If it is determined that the encoded image data are stored up to the address W/2 in the memory 103, the stored image data are read sequentially from the headmost address in the memory 103, and the read image data are written onto the optical disk D (step S812). At that time, it is further determined by the pickup displacement detection circuit 110 whether or not a write error due to displacement of the optical pickup 107 is detected (step S814). If it is determined that the write error is not detected, then the data writing onto the optical disk D continues until all the remaining image data in the memory 103 are read (step S814).

If the whole data stored in the memory 103 is written onto the optical disk D, the flow returns to the step S802.

On the other hand, if it is determined in the step S813 that the write error is detected, then the data writing onto the optical disk D is stopped (step S815). Thus, the encoded image data input after that are stored successively in the memory 103, the optical pickup 107 is recovered to the original recording position by the pickup displacement detection circuit 110, and it is then detected whether or not the data writing onto the optical disk D becomes possible (step S816).

Here, if it is determined that the data writing onto the optical disk D becomes possible, the image data subsequent to the data at the time when the data writing was stopped in the step S815 are read sequentially from the memory 103, and the read image data are written onto the optical disk D (step S817). After then, if a write error caused by displacement of the optical pickup 107 is again detected, the flow returns to the step S815 (step S818). Meanwhile, if a write error is not detected, the data writing onto the optical disk D continues until all the remaining image data in the memory 103 are read (step S819).

If all the image data stored in the memory 103 are written onto the optical disk D, the flow returns to the step S802.

If it is determined in the step S816 that the optical pickup 107 is not recovered to the original recording position, it is further determined whether or not the encoded image data are stored up to the address W/2 in the memory 103 (step S820). If it is determined that the encoded image data are not stored up to the address W/2 in the memory 103, the image data are stored still continuously in the memory 103, and the flow returns to the step S816. Meanwhile, if it is determined that the encoded image data are stored up to the address W/2 in the memory 103, the input encoded image data are stored successively after the address W/2 (step S821). After then, the flow returns to the step S816 to again check whether or not the write error period still continues.

As just described, in the present embodiment, if the recording position reaches near the position where the recording layer is to be changed over, the threshold of the data amount for starting the data writing from the memory onto the optical disk D is made small.

By doing so, the area of the memory which can be used for storage of the encoded image data corresponding to the recording layer transition and for countermeasure of the write error can be temporarily increased.

Therefore, a possibility that the image data is missing when the recording layer is changed over can be lowered without increasing a memory capacity.

Second Exemplary Embodiment

Subsequently, the second exemplary embodiment of the present invention will be described.

In the above-described first exemplary embodiment, the threshold of the data amount for starting the data writing from the memory onto the optical disk D is made small in the case where the present recording position reaches near the position where the recording layer is to be changed over.

On the contrary, in the present embodiment, data writing speed to the optical disk D is temporarily increased in the case where the present recording position reaches near the position where the recording layer is to be changed over.

Figure 9:
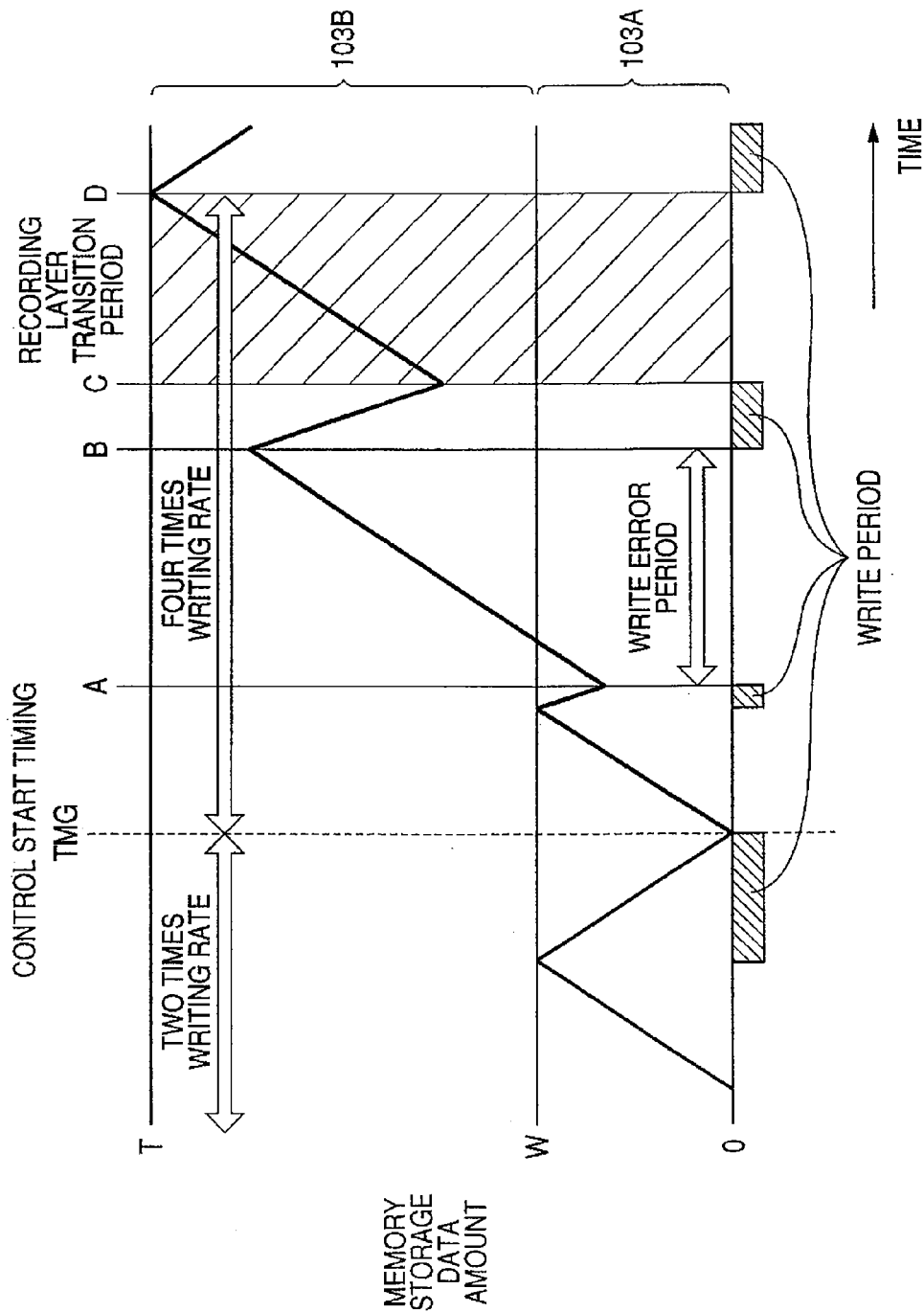
FIG. 9 is a diagram illustrating a change of the amount of data to be stored in the memory in a case where a write speed control operation according to the exemplary embodiment of the present invention is executed.

FIG. 9 is a diagram illustrating a change of the amount of data to be stored in the memory according to the present embodiment.

In the present embodiment, it is detected by the layer transition position detection circuit 111 detects that the present recording position becomes the position (track number) preceding to, by a predetermined value, the position (sector) where the layer transition for the optical pickup 107 is to be executed. For example, a signal of the layer transition position detection circuit 111 is output at the TMG point illustrated in FIG. 9.

Thereupon, the control circuit 112 makes the data writing speed to the optical disk D higher than the data writing speed before that.

More specifically, in the present embodiment, the data writing speed to the optical disk D is set to about twice the data rate of the encoded image data before the TMG point. On the other hand, the control circuit 112 changes the data writing speed to the optical disk D to about four times the data rate of the encoded image data, from the TMG point and up to completion of the transition of the recording layer.

Thus, around the recording layer transition, the image data stored in the memory 103 can be quickly written onto the optical disk D as compared with other periods. For this reason, the data amount to be stored in the memory 103 at the time when the recording layer transition starts can be reduced, whereby it is possible to improve safety of the recorded data around the recording layer transition.

Third Exemplary Embodiment

Subsequently, the third exemplary embodiment of the present invention will be described.

In the present embodiment, the data rate of the encoded image data is temporarily decreased in the case where the present recording position reaches near the position where the recording layer is to be changed over.

FIG. 10 is a diagram illustrating a change of the amount of data to be stored in the memory according to the present embodiment.

In the present embodiment, it is detected by the layer transition position detection circuit 111 that the present recording position becomes the position (track number) preceding to, by a predetermined value, the position (sector) where the layer transition for the optical pickup 107 is to be executed. For example, a signal of the layer transition position detection circuit 111 is output at the TMG point illustrated in FIG. 10.

Thereupon, the control circuit 112 controls the encoding unit 102 to make the target data rate of the encoded image data lower than the target data rate before that.

More specifically, as illustrated in FIG. 10, in a case where the target data rate is 9 Mbps at a position before the TMG point, the control circuit 112 changes the target data rate to 6 Mbps from the TMG point and up to completion of the transition of the recording layer.

Thus, since the data amount to be stored in the memory 103 per unit of time is reduced, it is possible to improve safety of the data around the recording layer transition.

Incidentally, it is needless to say that the objects of the present invention are also achieved by supplying a storage medium, which records a program code of software that can implement the functions of the above-mentioned exemplary embodiments to a system or an apparatus, that is, by reading out and executing the program code stored in the storage medium by a computer (or a CPU or MPU) of the system or the apparatus. In this case, the program code itself read out from the storage medium implements the functions of the above-mentioned exemplary embodiments, and the storage medium which stores the program code constitutes the present invention.

As the storage medium for supplying the program code, for example, a flexible disk, a hard disk, an optical disk, a magnetooptical disk, a CD-ROM, a CD-R, a magnetic tape, a nonvolatile semiconductor memory card, a ROM, and the like may be used. Further, there is a possibility that the functions of the above-mentioned exemplary embodiments can be implemented when the computer executes the read program code.

Further, it is needless to say that the present invention includes a case where the functions of the above-mentioned exemplary embodiments are implemented by some or all of actual processing operations executed by an OS (operating system) running on the computer based on an instruction of the program code.

Furthermore, it is needless to say that the present invention also includes a case where the functions of the above-mentioned exemplary embodiments are implemented by some or all of actual processing operations executed by a CPU or the like arranged in a function extension board or a function extension unit, which is inserted in or connected to the computer, after the program code read out from the storage medium is written in the memory of the extension board or unit.

While the present invention has been described with reference to the exemplary embodiments, it is to be understood that the invention is not limited to the disclosed exemplary embodiments. The scope of the following claims is to be accorded the broadcast interpretation so as to encompass all such modifications and equivalent structures and functions.

This application claims priority from Japanese Patent Application No. 2006-013089 filed on Jan. 20, 2006, which is hereby incorporated by reference herein.

The invention claimed is:

1. A recording apparatus comprising:
   an input unit configured to input information data;
   a memory configured to store the input information data;
   a writing unit configured to write the information data on a recording medium having a first recording layer and a second recording layer,
   the writing unit selecting one of the first recording layer and the second recording layer and writing the information data in the selected recording layer,
   the writing unit reading the information data from the memory and writing the information data read from the memory in the selected recording layer of the recording medium in response to an amount of the information data stored in the memory reaching a threshold, and
   the writing unit being arranged to change a writing position of the information data in the first recording layer to a writing position in the second recording layer, in response to the recording position of the information data in the first recording layer reaching a predetermined switching position in the first recording layer;
   a control unit configured to change the threshold from a first threshold to a second threshold smaller than the first threshold in response to the writing position of the information data in the first recording layer reaching a position determined relatedly to the switching position.

2. An apparatus according to claim 1, wherein the control unit changes the threshold from the second threshold to the first threshold in response to completion of the switching of the writing position of the information data from the writing position in the first recording layer to the writing position in the second recording layer.

3. An apparatus according to claim 1, wherein the writing unit repeatedly writes the information data stored in the memory every time the amount of the information data stored in the memory reaches the second threshold after the writing position of the information data in the first recording layer reaches the position determined relatedly to the switching position.

4. An apparatus according to claim 1, wherein the control unit controls the writing unit to stop writing the information data on the recording medium if a writing error of the information data on the recording medium is detected,
   the control unit changes the threshold from the first threshold to the second threshold so that larger storing area of the memory is available for storing the information data input by the input unit during the stop of writing the information data by the writing error.

* * * * *